Oct. 4, 1960 G. L. HOBROUGH 2,955,263
THYRATRON MODULATOR FOR SHORT PULSE RADAR AND THE LIKE
Filed Nov. 30, 1956 2 Sheets-Sheet 1

*Inventor*
GILBERT L. HOBROUGH
by: J. Richard Cavanaugh

Oct. 4, 1960  G. L. HOBROUGH  2,955,263
THYRATRON MODULATOR FOR SHORT PULSE RADAR AND THE LIKE
Filed Nov. 30, 1956  2 Sheets-Sheet 2

Inventor
GILBERT L. HOBROUGH

# United States Patent Office 2,955,263
Patented Oct. 4, 1960

2,955,263

THYRATRON MODULATOR FOR SHORT PULSE RADAR AND THE LIKE

Gilbert Louis Hobrough, Oshawa, Ontario, Canada, assignor to The Photographic Survey Corporation Limited, Toronto, Ontario, Canada Filed Nov. 30, 1956, Ser. No. 625,352

9 Claims. (Cl. 331—87)

This invention relates to a thyratron modulator adapted for aerial survey radar and like applications wherein a series of extremely short pulses of energy is desired to be produced at less than $10^{-7}$ seconds duration with a uniform thyratron firing delay to obtain a maximum precision.

A radar transmitter generally may embody a pulse generator, a driver unit, modulator and magnetron. The modulator controls the magnetron causing radio frequency energy to be produced in short powerful pulses. Ordinarily, the modulator controls the shape and duration of the pulses and exercises control by applying pulses of plate to cathode voltage to the transmitter tube or magnetron. Generally, a nearly rectangular modulator voltage pulse is preferred for radar systems to provide a steep leading edge permitting accurate range measurement of echo pulses effected by comparing the delay time of echo pulses against pulses from the transmitter. In ordinary radar systems, short pulses are used to achieve high resolution. On the other hand, aerial survey radar requires a high precision with light weight equipment and thus short pulses are likewise used but for different reasons.

In line pulsing modulators, a high power pulse is formed by a network and delivered directly to the transmitter; that is, the magnetron. Prior development of aerial survey radar equipment has required the use of a thyratron as a component in the modulator of the transmitter to enable the production of short pulses with an accompanying saving in weight as compared with the use of so-called "hard tube modulators." In particular, a hydrogen thyratron has been employed heretofore as an effective switching device in a transformer coupled line-pulsing modulator. The short ionization and de-ionization times of hydrogen thyratrons particularly adapt them for such use. During ageing, the firing of the thyratron by driver pulses may be subject to variation causing a delay error to occur. Moreover, slight changes in the firing characteristics due to effects such as temperature, for example, may cause substantial delay variation to occur in the triggering or firing time of the thyratron. The errors which do arise and which are due substantially to tube errors, may cause pulse delay errors as large as two or three times $10^{-8}$ seconds, thereby obviating the utility of gas tube modulators for precise distance measurement in aerial surveys and comparable precision operations requiring the use of very short signal pulses of a width of the order of $10^{-7}$ seconds or less.

It is the main object of the invention to provide an improved modulator unit of the thyratron type in which inherent variable delay characteristics of thyratron operation heretofore obviating the use of same for precision pulses shorter than about $10^{-7}$ seconds are utilized substantially as a control characteristic enabling the entry of a correction for delay errors into the modulator.

In a more general sense, it is the object of the invention to provide a thyratron pulse delay equalizing system dependent upon a previously unrecognized advantageous characteristic of thyratron operation and useful in very short pulse generating systems for example, in aerial survey radar in which very high precision is desired.

It is another object of the invention to provide the improvements in a modulator unit for a radar transmitter or the like having a thyratron, of means for varying the firing signal for the thyratron responsive to a detected delay error in firing of the thyratron to thereby correct the firing delay of the thyratron for the next following pulse.

It is another object of the present invention to provide an improved modulator unit of the thyratron type for a radar transmitter or the like including a variable amplification driver therefor in which the amplifier is proportionally controlled responsive to thyratron delay variation or delay error in signal pulses obtained from the modulator or the transmitter, as the case may be, to control the amplitude of triggering pulses for the thyratron of the modulator and hence correct for delay errors.

With the foregoing and other objects in view, the invention will be appreciated in more detail by a study of the following specification taken in conjunction with the accompanying drawings.

The pulse delay equalizing system of the invention is especially useful for equalizing the pulse delay of so-called "center reference pulses." Preferably and according to this invention, the pulse has a shape corresponding to that of a probability curve and is identified herein as of "gaussian" shape. Though the preferred pulse is identical with a pulse of gaussian spectrum, it is not necessary that pulse form be restricted thereto, so long as band width requirements are met. An ideal minimum band width is obtained by utilizing a pure gaussian pulse. Regardless of the specific pulse shape of center reference type employed, the shape must be symmetrical with respect to the center reference point at least in a region near the apex thereof.

Figure 1:
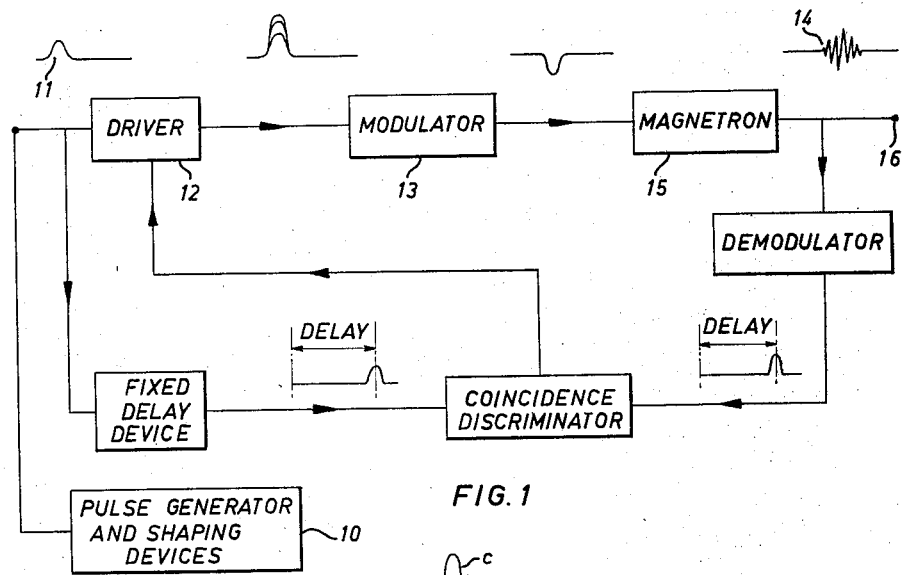
Figure 1 shows a general schematic outline of a system adapted to provide very short radar pulses having an equalized delay time.

In Figure 1, the pulse generator and shaping devices 10 of known circuitry provide the pulses 11 of gaussian form spaced by a relatively uniform time delay. The pulses 11 are amplified by a driver unit 12 and modulator 13 to provide a modulated wave form in the form of pulses of energy 14 from the conventional magnetron device 15 from which radio frequency pulse energy may be taken at the output terminal 16 to be utilized in any suitable manner such as for a radar transmitting signal. In a general sense, many radar systems embody a pulse generator, modulator and magnetron unit.

The invention contemplates that a hydrogen type of thyratron be employed as a modulator in the modulating device 13. In usual thyratron operation, the delay occurring between the moment at which a firing potential is applied to the grid or control electrode and the moment of conduction through the tube, decreases markedly with an increase of firing potential. Heretofore, this characteristic was generally regarded as an inherent disadvantage which rendered the thyratron impractical when required to fire, that is, conduct, within a fixed or very short time from pulse actuation by application of a triggering pulse to the control electrode thereof.

According to the present invention, however, this normally disadvantageous characteristic of thyratron operation is utilized to obtain a controllable delay in thyratron firing or conduction responsive to a control triggering pulse of an amplitude which is a function of a measured delay error in firing or pulse output of the thyratron. The change in firing delay time with change in amplitude of applied triggering pulse is substantially reciprocal. This reciprocal function is recognized in the present invention as a novel thyratron characteristic which has been found to be sufficiently constant under given operating conditions to provide a precise delay controlling function. According to the invention, extraneous circuit errors are eliminated by applying a delay error correction and control by way of a feed-back loop containing means for measuring thyratron firing delay errors.

The pulse delay equalizing system of the invention embodies the addition to conventional radar components including driver modulator and magnetron or equivalent units of a demodulating device for signals from the magnetron as shown to obtain a demodulated pulse signal having a delay comprised of delay occasioned by circuitry from the driver to the demodulator and delay error. The demodulated signal is fed to a coincidence discriminator hereinafter described in more detail and is compared with a fixed delay signal obtained from a conventional fixed delay device which obtains pulses from the pulse generator and shaping devices at a point immediately in advance of the driver unit and applies a constant time delay thereto corresponding to the predetermined time delay which each pulse experiences in passing through the driver, modulator, magnetron and demodulaotor. The fixed delay device may be in the form of any suitable delay network of well known form.

The system of the invention therefore contemplates the comparison of the fixed delay signal and the demodulated signal, each of which contains the same fixed delay in order to obtain a direct current signal responsive to the error portion only of the delay occurring in the demodulated signal. The direct current signal so obtained is fed as the control signal Sc to the driver unit shown in Figure 1 and illustrated in simplified schematic form in Figure 2.

Figure 2:
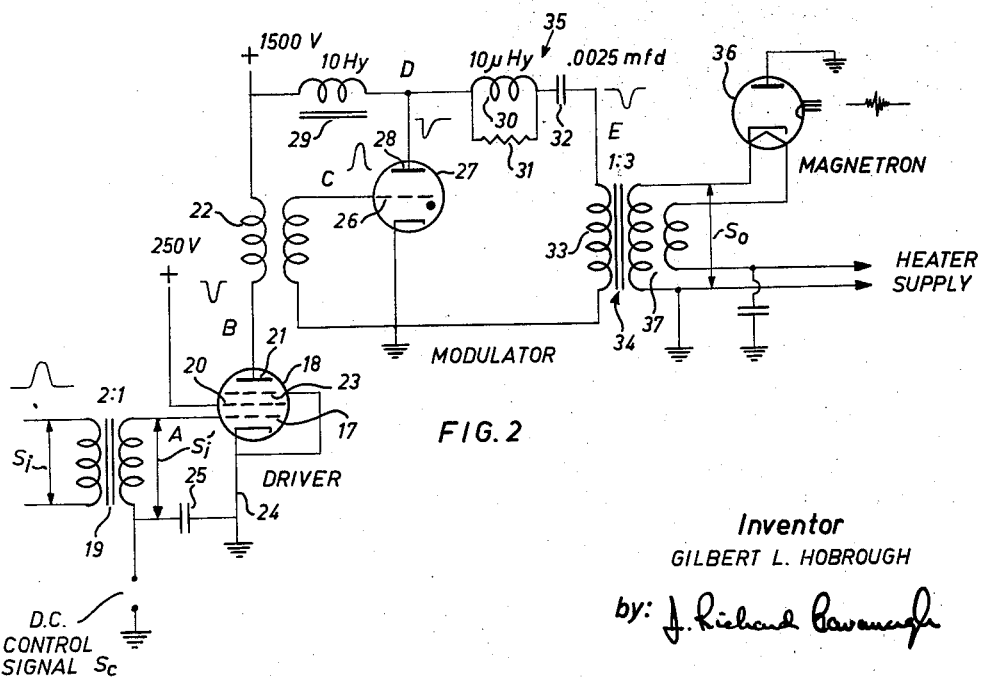
Figure 2 is an electrical schematic of the driver and modulator unit of Figure 1 wherein the circuitry shown is simplified to reduce it to the main essentials; the lower left-hand portion of the figure representing the driver unit; and the right-hand upper portion of the unit representing the modulator and magnetron.

Figure 2 discloses the driver modulator and magnetron units of Figure 1 in simplified schematic form. An input triggering pulse $S_1$ is coupled to the control grid 17 of the driver proportional amplifier pentode tube 18 through the coupling pulse transformer 19, the latter preferably being of a two-to-one ratio as shown and having a ferrite core. The screen grid 20 is maintained at a fixed normal operating potential (say 250 volts as shown) and the plate 21 is operated through the plate circuit transformer 22 at a relatively high voltage of say 1500 volts. The suppressor grid 23 is directly connected to the cathode 24. Condenser 25 provides a low impedance path between the secondary of transformer 19 and grounded cathode 24. Accordingly, the direct current signal Sc biases the control grid 17 in a manner responsive to delay errors in the pulses proceeding from the magnetron of Figure 1. A change in the bias of grid 17 effects a control on the amplitude of voltage pulses obtained from the amplifier tube 18 whereby, for the same amplitude of input signal $S_1$ to the driver but for different amplitudes of control voltage Sc which may be designated as amplitudes a, b, c, different amplitudes of output pulses may be obtained as shown at B. The plate circuit of the driver amplifier tube 18 is coupled to the control grid electrode 26 of the thyratron 27 through the inverting one-to-one pulse transformer 22 so that the wave form at C is positive going for electrode 26 as shown at the upper portion of Figure 3.

The amplifier 18 operates in such manner that a variation in the control bias signal Sc varies the amplitude of the plate current pulse from a maximum value occurring when the control bias is substantially equal to the amplitude of the signal pulse on the control grid 17 to zero when the control bias signal is increased to a value equal to the cut-off bias of the tube plus the signal pulse amplitude. Under maximum bias signal conditions, the grid 17 may be driven positive on the pulse peaks. The control voltage ranges between a minimum value equal to or slightly less than the signal $S_1'$ and a maximum value of substantially $S_1'$ plus the cut-off potential for the particular tube employed. The output plate current pulse is relatively unchanged in form as compared with the input pulse particularly in the region of maximum amplitude, that is, especially in the region of center reference. Such narrowing of the pulse form as may occur on the sides thereof due to tube characteristics, tends both to sharpen the wave form and to improve the resolution of the center reference feature.

Assuming representative values throughout the schematic of Figure 2 for a selected example of operation, the anode 28 of thyratron 27 is connected to a 1500 volt supply as indicated through an iron core choke 29 (10 henry). A pulse shaping network comprising inductance 30, resistor 31 and condenser 32 is connected in series with the primary winding 33 of the pulse output transformer 34. In operation, the values of choke 29 and condenser 32 are adjusted by known methods to provide a resonant frequency equal to one-half of the pulse repetition frequency of the radar or pulse generating system. The condenser 32 charges to supply voltage, that is, to 1500 volts in the first instance, through inductance 30 and choke 29, the point E at such instant being at ground potential. Firing of the thyratron 27 causes the potential at D to drop from 1500 volts to approximately 50 to 75 volts above ground potential. Prior to discharge of condenser 32, the circuit at point E assumes a momentary potential of minus 1500 volts with respect to ground. The condenser 32 then discharges through the primary 33 of transformer 34, the pulse shaping network 35 and thyratron 27, thereby transferring a major portion of its stored energy through transformer 34 to the magnetron 36 energized by the output signal $S_o$ from the dual secondary windings 37.

After discharge of the condenser 32, the current through the thyratron 27 drops to a value below that required to maintain ionization, thus terminating discharge through the thyratron. Further action of the thyratron cannot occur until a further triggering pulse is applied to the control electrode.

The condenser 32 is now recharged through inductance 30 and choke 29 to a potential of approximately twice the supply voltage; that is, 3000 volts in the present example, at which point of operation, the following pulse derived from the signal $S_1$ fires the thyratron for a repetition of the foregoing sequence of operation. During charging of the condenser 32, where the resonant period of the choke 29 and condenser 32 is twice the trigger pulse spacing or delay time, the charging potential rises on substantially a sine wave curve to about twice the value of supply voltage for anode 28. The pulse shaping network comprising the inductance 30 and resistor 31 limits the current through the thyratron 27 to a safe value being adjusted by the damping resistor 31 to provide a current wave pulse of approximate gausian form through the primary winding 33 of transformer 34. In particular, the desired peak characteristics of the wave form are preserved.

Figure 3:
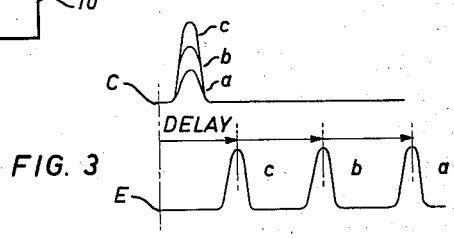
Figure 3 shows the voltage wave form at C of Figure 2 and the resulting corresponding current wave forms of controlled delay at E in Figure 2.

It will be apparent from the foregoing that the pulses of controlled amplitude at B responsive to control signal $S_c$ and applied in positive going form at C to grid 26 of thyratron 27 from inverting transformer 22, produce a negative output wave form pulse at the anode 28 of a steep leading edge as shown which is shaped by the network 35 to the form shown at E in such manner that the pulses at E arrive on a controlled delay time base as indicated in the lower portion of Figure 3. Thus, as previously described, the grid pulses at C of controlled amplitude provide substantially corresponding output pulses of controlled delay, the amount of delay being applied as a correction to the pulse to obviate thyratron delay errors. By this means, a firing time precision can be achieved to a degree heretofore unattainable with very short pulse thyratron modulators.

In the comparison type of feed back loop control applied in the delay equalizing system of the invention, various devices may be employed for obtaining a direct current control signal proportional to delay errors. In this respect, however, such devices are not well known and accordingly the following disclosure sets forth two suitable forms of coincidence discriminator each of which embodies features of novelty.

Figure 4:
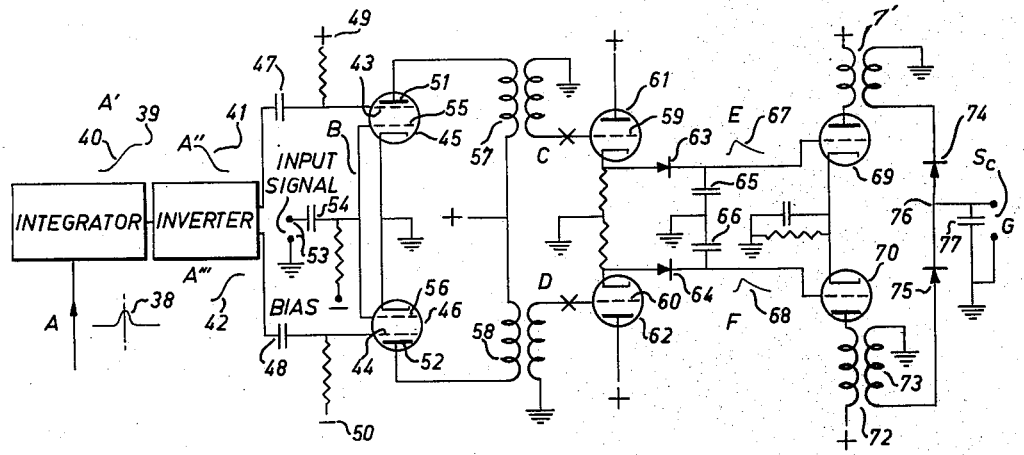
Figure 4 is an electrical schematic disclosing one suitable form of coincidence discriminator which may be used as a part of the pulse delay equalizing system of the invention.

Figure 4 discloses one form of coincidence discriminating system adapted to provide the direct current control signal $S_c$ responsive to a delay error in the input signal from the demodulator of Figure 1 as measured against a delayed signal obtained from the fixed delay device of Figure 1. The delayed signal 38 is processed by a suitable shaping device such as a conventional integrator to obtain an S-shaped wave form 39 having a steep substantially straight line sloped portion 40 in which the midpoint thereof represents the peak of signal 38 at a reference time indicated hereinafter as $T_0$. The wave form 39 decreases to zero before arrival of a following pulse.

The inverter processes the signal from the integrator to provide opposed screen grid control signals 41 and 42 coupled to the screen grids 43 and 44 of the amplifying tetrodes 45 and 46 by the coupling condensers 47 and 48 respectively. The screen grid of the tetrode tube 45 is biased positively by a suitable source (not shown) as indicated by the positive sign 49 whereas the screen grid of the tube 46 is biased negatively as indicated by the sign 50. In operation, therefore, the signals 41 and 42 to a greater or lesser degree suppress electron emission to the plates 51 and 52 responsive to the signals 41 and 42 in such manner that the screen grid 44 being negatively biased in the first instance, renders the tube 46 initially non-conducting whereas tube 45 is conducting at a predetermined maximum. Upon entry of signals 41 and 42, screen grid 43 becomes more negative to a limiting substantially non-conducting value and screen grid 44 becomes proportionally more positive toward the maximum conducting condition. Both tubes are adjusted by means of the biasing 49 and 50 to conduct substantially equally when the signals 41 and 42 arrive on their screen grids at the instant $T_0$ at which each of the signals 41 and 42 are at one-half their maximum amplitudes.

An input signal applied to the terminals indicated at 53 through conventional coupling condenser 54 and conventionally biased control grids 55 and 56, is amplified substantially selectively to a greater or lesser degree by the tubes 45 or 46 responsive to the instantaneous value of the signals 41 and 42 on the screen grids 43 and 44. Thus, if, at a given time instant $T_0$ both tubes 45 and 46 are equally conducting corresponding to the instant in time of the midpoint of the steep slope portion of signals 41 and 42 and if the peak point or center reference line of the input signal arrives at the same instant $T_0$, the output of each of the tubes 45 and 46 will be the same. If, however, the input signal arrives slightly in advance of the reference time $T_0$ in the screen control signals 41 and 42, the tube 45 will be at that moment capable of developing a greater output signal than the tube 46 since its screen grid will be more positive than screen grid 44 of tube 46. On the other hand, if the input signal is late as compared with the reference time $T_0$, the tube 46 will be in a condition developing a greater output signal than the tube 45 because its screen grid will be at a greater positive potential than the screen grid of tube 45.

Since the pulses of greater or lesser magnitude obtained from the plate circuits of the tubes 45 and 46 will be generally of very short duration, the immediate rectification thereof to obtain a direct current signal responsive to delay error, is undesirable in view of the short duty ratio available and the heavy current circuitry which would necessarily be involved in any output rectifying processing thereof. Accordingly, the pulse shaping and rectifying circuit portion of the discriminating system shown in Figure 4 is generally indicated to the right of the diagram beyond X marks therein to designate a portion of the circuitry beyond the essential discriminating function and which provides for a stretching of the pulses before rectification to enable amplification and rectification by conventional components.

Transformers 57 and 58 complete the plate circuits of the delay differential amplifier tubes 45 and 46 and provide positive going signal pulses through secondaries to the grids 59 and 60 of the triodes 61 and 62 disposed in cathode follower connection providing a suitable low impedance match to the rectifying devices or diodes 63 and 64. In operation, a pulse appearing on one of the diodes progresses up to its maximum value and then the corresponding by-pass condenser 65 or 66 respectively controls the decay time from the peak value of potential on the wave form over a stretched time base as indicated by the wave form configurations 67 and 68. The triode power amplifier tubes 69 and 70 are energized on their grids by the stretched signal pulses 67 and 68 and deliver their output to the corresponding plate transformers 71 and 72. It is to be noted that the secondary winding 73 of the plate transformer 72 is connected in reverse manner as compared with the secondary of transformer 71 to the rectifying devices 74 and 75 connected in series therebetween. By this means, a direct current output may be obtained from the point 76 between the rectifying devices 74 and 75 and ground which will have a predetermined value for equal power output signals from the tubes 69 and 70 and will move to a higher or lesser value for advance or delay input signals respectively at the terminals 53. A suitable by-pass condenser 77 removes unwanted components from the signal $S_c$ thus obtained.

Figure 5:
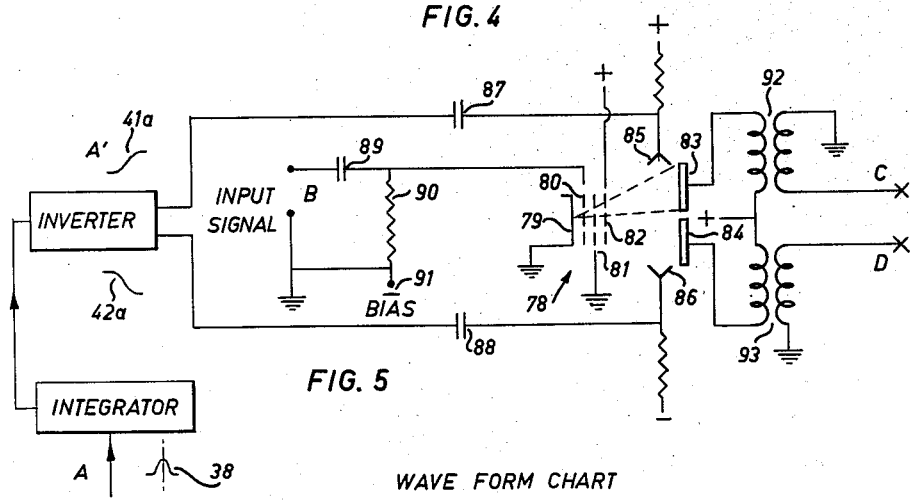
Figure 5 is an electrical schematic of a deflection beam type of coincidence discriminator of a type set forth in co-pending application Serial No. 625,353, filed November 30, 1956 which, it will be understood, is adapted to be substituted for the left-hand portion of Figure 4 at the junctions X—X.

A modified form of pulse delay discriminating device is shown in Figure 5 and corresponds in function to that part of the schematic of Figure 4 to the left of the "X" marks therein, it being understood that the device of Figure 5 may be substituted for the said left hand portion of the diagram of Figure 4. In the device of Figure 5 a so-called "sheet beam tube" is employed. The tube has an electron beam movable under the influence of a shiftable electrostatic field selectably over two target anodes and is used herein for discriminating the delay of input signal against the reference time point $T_0$ of the inverted reference signals 41a and 42a. While any known form of dual target electrostatic deflection type tube may be employed, it is preferred to use a tube construction obtainable commercially under the accepted North American designation 6AR8. In any case, the sheet beam tube used comprises an electron gun structure 78 having a cathode 79 emitting an electron beam through the control electron grid 80, focusing electrode 81 and accelerating electrode 82 toward the target anodes 83 and 84. Electrostatic deflecting plates 85 and 86 are charged by exterior sources (not shown), the one positive and the other negative, to cause the electron beam to be deflected normally toward the target anode 83 as indicated by chain lines. The signals 41a and 42a are applied to the deflecting plates 85 and 86 through coupling condensers 87 and 88 to cause the electron beam to strike the anodes 83 and 84 equally at the point $T_0$ in time at which the deflecting plate potentials are equal. The electron beam will continue to swing as the charge of the deflection plates changes under influence of reference signals 41a and 42a until it strikes the anode 84 at which point the deflecting plate 86 is positive and the deflecting plate 85 negative. Accordingly, the electron beam is adapted to swing or sweep back and forth over the target anodes 83 and 84 in accordance with the reference or sweep signals 41a and 42a.

The input signal obtained from the demodulator of Figure 1 is coupled through the condenser 89 and resistor 90 to the control electrode or grid 80. Biasing at 91 normally biases the control electrode to cut-off, thereby preventing the progress of the electron stream from the cathode 79 to the target anodes 83 and 84. Therefore, the input signal permits the flow of electrons toward the target anodes in such distribution thereover as will be determined by the potentials on the deflection plates 85 and 86, governed by the sweep signals 41a and 42a. Thus, if the peak value of the input signal is coincident in time with the point $T_0$ on the reference wave forms 41a and 42a, the electron stream will strike target anodes 83 and 84 equally and the resulting opposed anode or plate circuits including transformers 92 and 93 coupled to the pulse stretching and rectifying circuit of Figure 4 will deliver a predetermined direct current output $S_0$. On the other hand, if the input signal leads the time point $T_0$ the electron beam will strike the anode 83 at the peak value of the input signal and the resulting direct current output $S_0$ will be more negative than the said predetermined value. Furthermore, if the input signal lags the reference time $T_0$, the electron beam will strike the target 84 and the resulting direct current output $S_0$ will be more positive than the predetermined value.

Figure 6:
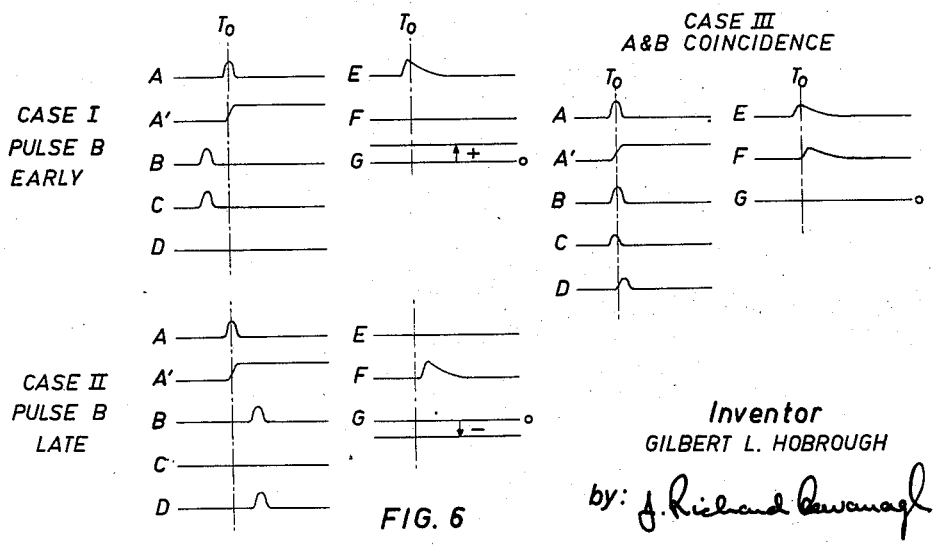
Figure 6 is a chart showing the wave forms of Figures 4 and 5 for early, late and coincident signals.

In Figure 6, a wave form chart is set forth for cases I, II and III shown, in which pulse B is early, pulse B is late and pulse B is coincident with pulse A, respectively. The pulses are shown at the points A, A', B, C, D, E, F and G in Figures 4 and 5.

In a general sense, the pulse delay error discriminator shown is of a dual channel amplifier form adapted to amplify thyratron output or demodulator output pulses in each channel thereof. The reference sweep signals derived from the input signal $S_i$ (Figure 2) are employed with a fixed time delay for increasing the amplification of one channel while proportionally decreasing the amplification of the other channel to provide equal amplification in both channels at a selected reference point in time in the input signal pulse, i.e., at the center reference line or peak value thereof. The proportional swinging or shifting in amplification of the two channels is therefore synchronized with input signal $S_i$ or more exactly by the signal $S_i$ including a fixed delay therefor applied by the fixed delay device of Figure 1. Therefore, the signals amplified by the discriminator will be amplified more or less by one channel or the other according to the advance or delay thereof in time with respect to the reference time of the sweep or amplification control signals. The output of the dual channel amplifier or delay error discriminator is converted to a direct current signal form $S_c$ usable as a biasing control for driver amplifier 18 to control the amplitude of output signals thereof proportional to delay error and hence to control the delay of output pulses from thyratron 27.

It will be apparent that other methods may be employed for coincidence or delay discrimination in place of the continuously selectable dual channel amplifier type of discriminator above outlined so long as a direct current control signal $S_c$ is obtained responsive to delay error as discussed herein. In this sense, therefore, apparatus accomplishing a function as set forth in the devices of Figures 4 and 5 or in any case attaining a usable control signal will be recognized as means for generating a delay error control signal having a control characteristic which is a function of delay error and therefore responsive thereto.

The novel thyratron operation herein set forth is dependent upon controlling the firing thereof by means of firing pulses of controllable amplitude responsive to pulse delay error. The thyratron firing pulses are, in turn, obtained from a pulse signal by applying a variable amplification thereto responsive to signal delay error.

The distance measuring precision of a radar device is dependent upon the timing precision of echo delay measurement accomplished by comparing the time of pulse emission from the transmitter and the time of the received echo pulse. The invention achieves greater precision in determining the instant of pulse transmission and thereby enables a greater precision in distance measurement than heretofore. When applied to a crystal controlled precision pulse radar altimeter for aerial survey purposes, the invention decreased the fixed error of measurement of an already high precision system from about plus or minus fifteen feet to plus or minus three feet or less, thereby enabling map contour plotting to close intervals without the use of separate ground control by ground survey parties.

Having regard to the foregoing, various modifications of circuit details and arrangements will be evident to skilled persons. The application of the invention in a variety of uses will also be evident in cases where a precise uniformity of thyratron firing delay is desired, particularly in radar systems and the like where such uniformity may be critical to precise distance measurement.

What I claim is:

1. In a modulator unit for a radar transmitter or the like having a thyratron containing a control electrode, an anode and a cathode, the combination therewith of: means for generating signal pulses of substantially uniform spacing in time; means for applying said signal pulses to said control electrode to effect firing of said thyratron; means connected to said anode for obtaining a delayed pulse from said anode upon firing of said thyratron; fixed delay means energized by said signal pulse and providing a reference signal of constant delay against which a delay error of said delayed anode pulse may be measured; means for measuring the delay error of said anode pulses; means for generating a delay error control signal responsive to the measured delay error of pulses obtained from said anode with respect to said reference signal; and means responsive to said delay error control signal for proportionally amplifying said signal pulses applied to said control electrode to control the firing delay of said thyratron by said signal pulses responsive to said delay error, thereby rendering the pulses obtained from said thyratron of uniform time delay.

2. In a modulator unit for a radar transmitter or the like having a thyratron containing a control electrode, an anode and a cathode, the combination therewith of: means for generating signal pulses of the center reference type of substantially uniform spacing in time; means for applying said signal pulses to said control electrode to effect firing of said thyratron; means connected to said anode for obtaining a pulse from said anode upon firing of said thyratron; fixed delay means energized by said signal pulse and providing a reference signal of constant delay against which a delay error of said delayed anode pulse may be measured; means for measuring the delay error of said anode pulse; means for generating a delay error control signal responsive to the measured delay error of pulses obtained from said anode with respect to said reference signal; means responsive to said delay error control signal for proportionally amplifying said signal pulses applied to said control electrode to control the firing delay of said thyratron by said signal pulses responsive to said delay error, thereby rendering the pulses obtained from said thyratron of uniform time delay; and means for shaping the pulse obtained from said anode to provide substantially a uniform shaping thereof about a central peak value therein.

3. In a modulator unit for a radar transmitter or the like having a thyratron containing a control electrode, an anode and a cathode, the combination therewith of: means for generating signal pulses of substantially uniform spacing in time; means connected to said anode for obtaining an anode pulse of non-uniform delay from said anode upon delayed firing of said thyratron; means providing a direct current signal of an amplitude responsive to the non-uniformity of delay of pulses obtained from said anode; means for amplifying said signal pulses including an electron tube amplifier; means coupling said amplifier to the control electrode of said thyratron to effect firing of said thyratron responsive to said amplified signal pulses; and means for applying said direct current signal to said amplifier providing biasing thereof and control of the amplitude of signal pulses obtained therefrom responsive to said pulse delay error thereby rendering the pulses obtained from said anode of uniform time delay.

4. In a modulator unit for a radar transmitter or the like having a thyratron containing a control electrode, an anode and a cathode, the combination therewith of: means for generating signal pulses of substantially uniform spacing in time, each pulse having a reference point in time; means for obtaining a pulse from said anode upon firing of said thyratron; a dual channel amplifier adapted to amplify said anode pulse in each channel thereof; means increasing the amplification of one channel while proportionally decreasing the amplification of the other channel in delayed synchronism with said signal pulses and providing equal amplification by said channels at the delayed reference point in time of each signal pulse; means differentially rectifying the anode pulse amplified by said channels of said dual channel amplifier to provide a control signal proportional to the delay error of said anode pulse with respect to the delayed reference point in time of said signal pulses; means responsive to said control signal for proportionally amplifying said signal pulses; and means applying said proportionally amplified signal pulses to said control electrode to control the firing delay of said thyratron by said signal pulses responsive to said delay error and thereby rendering the anode pulses obtained from said thyratron of uniform time delay.

5. In a modulator unit for a radar transmitter or the like having a thyratron containing a control electrode, an anode and a cathode, the combination therewith of: means for generating signal pulses of the center reference type of substantially uniform spacing in time, each pulse having a center reference point in time; means for obtaining a pulse from said anode upon firing of said thyratron; a dual channel amplifier adapted to amplify said anode pulse in each channel thereof; means including a fixed delay device and responsive to said signal pulses for increasing the amplification of one channel of said amplifier while proportionally decreasing the amplification of the other channel and providing equal amplification therein at the peak value of each signal pulse corresponding to the center reference point thereof but at a fixed delay; means for differentially rectifying the anode pulse amplified by said channels of said dual channel amplifier to obtain a control signal proportional to the delay error of said anode pulse compared to the delayed reference point in time of said signal pulse; means responsive to said control signal for proportionally amplifying said signal pulses; and means applying said proportionally amplified signal pulses to said control electrode to control the firing delay of said thyratron by said signal pulses responsive to said delay error thereby rendering the anode pulses obtained from said thyratron of uniform time delay.

6. In a modulator unit for a radar transmitter or the like having a thyratron containing control electrode, an anode and a cathode, the combination therewith of: means for generating signal pulses of substantially uniform spacing in time, each pulse having a reference point in time; means for obtaining a pulse from said anode upon firing of said thyratron; a dual channel amplifier adapted to amplify said anode pulse in each channel thereof; means increasing the amplification of one channel while proportionally decreasing the amplification of the other channel in delayed synchronism with said signal pulses and providing equal amplification by said channels at the delayed reference point in time of each signal pulse; means differentially rectifying the anode pulse amplified by said channels of said dual channel amplifier to obtain a control signal proportional to the delay error of said anode pulse with respect to the delayed reference point in time of said signal pulses; means responsive to said control signal for proportionally amplifying said signal pulses; means applying said proportionally amplified signal pulses to said control electrode to control the firing delay of said thyratron by said signal pulses responsive to said delay error thereby rendering the anode pulses obtained from said thyratron of uniform time delay; and means for shaping the pulse obtained from said anode to provide a substantially uniform shaping thereof about a central peak value therein.

7. In a modulator unit for a radar transmitter or the like having a thyratron containing a control electrode, an anode and a cathode, the combination therewith of: means for generating signal pulses of the center reference type of substantially uniform spacing in time each having a reference point corresponding to the peak value thereof; means for obtaining a pulse from said anode upon firing of said thyratron; a dual channel amplifier for amplifying said anode pulse in each channel thereof; means including a fixed delay device for increasing the amplification of one channel of said amplifier while proportionally decreasing the amplification of the other channel responsive to said signal pulses and providing equal amplification by said channels at each peak value reference point of said signal pulses but at a fixed delay; means providing a control signal responsive to the relative amplification of said anode pulse by said channels of said dual channel amplifier, said control signal thereby representing the delay error of said anode pulse with respect to said signal pulses including a fixed delay therefor; means for amplifying said signal pulses; means coupling said signal pulse amplifying means to the control electrode of said thyratron to effect firing of said thyratron and to control the firing delay thereof responsive to the amplitude of said amplified signal pulse; and means for applying said control signal to said signal pulse amplifying means to effect biasing thereof and control of the amplitude of signal pulses obtained therefrom responsive to said anode pulse delay error, thereby rendering the pulses obtained from said anode of uniform time delay.

8. In combination: means for generating signal pulses of the center reference type; a driver unit including means for variably amplifying said signal pulses; a modulator including a thyratron having an anode, a control electrode and a cathode; means for applying amplified signal pulses from said driver to the control electrode of said thyratron to effect firing of the latter providing anode pulses of non-uniform delay; and a coincidence discriminator including a fixed delay device for said signal pulses for controlling the amplification of said driver unit responsive to the difference in delay of said anode pulses and said signal pulses delayed by said fixed delay device.

9. In combination: means for generating signal pulses of the center reference type; a driver unit for amplifying said signal pulses; a modulator including a thyratron having an anode, a cathode and a control electrode; means coupling said driver and said modulator to effect firing of said thyratron by signal pulses amplified by said driver providing anode pulses of non-uniform delay; a magnetron unit providing radio frequency pulses responsive to pulse obtained from the anode of said thyratron upon firing of the latter; means for demodulating radio frequency signal pulses obtainable from said magnetron; means including a fixed delay device for said signal pulses providing a control signal responsive to the delay difference between said demodulated radio frequency pulses and said delayed signal pulses; and means biasing said driver unit responsive to said control signal for controlling amplification of said signal pulses and thereby the firing delay of said thyratron responsive to said delay difference, to render said radio frequency pulses of uniform time delay.

References Cited in the file of this patent

UNITED STATES PATENTS

| | | |
|---|---|---|
| 2,462,857 | Ginzton et al. | Mar. 1, 1949 |
| 2,469,174 | Okrent | May 3, 1949 |
| 2,492,685 | Coroniti | Dec. 27, 1949 |
| 2,509,269 | Hana | May 30, 1950 |
| 2,764,684 | Mayer | Sept. 25, 1956 |
| 2,766,382 | Dawson | Oct. 9, 1956 |
| 2,786,180 | Cohn | Mar. 19, 1957 |